April 22, 1947.   F. ZEILER   2,419,306

CLAMPING MEANS FOR MIRROR DEVICES AND THE LIKE

Filed Oct. 5, 1945

INVENTOR
FRANK ZEILER
BY
ATTORNEYS

UNITED STATES PATENT OFFICE 2,419,306

CLAMPING MEANS FOR MIRROR DEVICES AND THE LIKE

Frank Zeiler, Brooklyn, N. Y., assignor to The Roberk Company, Norwalk, Conn.

Application October 5, 1945, Serial No. 620,552

2 Claims. (Cl. 248—226)

This invention relates to new and useful improvements in brackets for supporting rear view mirrors or like accessories to be supported on the doors of automobiles.

The object of the invention is to construct a bracket which is composed of a minimum number of simple parts, is economical to manufacture, is compact and durable in use, and is easy to attach and to remove.

Further and more specific objects, features, and advantages will more clearly appear from a consideration of the specification hereinafter especially when taken in connection with the accompanying drawings which illustrate a present preferred form which the invention may assume and which form part of the specification.

Briefly and in general terms the invention includes means to be clamped to the flange portion of an automobile door or equivalent portion of the car. One portion of this clamping means is resilient and is adapted to be pressed against the jamb of the door. On the other portion of the clamping means is disposed a mirror supporting element as well as adjustable means to engage the adjacent face of the flange to securely hold the device in place. Slidable along the mirror supporting means is a casing which is adapted to enclose the exposed portions of the clamping means and preferably there are provided co-operating elements on the clamping means and the casing to engage and latch the casing in its enclosing position.

The present preferred form which the invention may assume is illustrated in the drawings, in which, Figure 1 is a plan view of the bracket attached to the flange of an automobile door.

Figure 1:
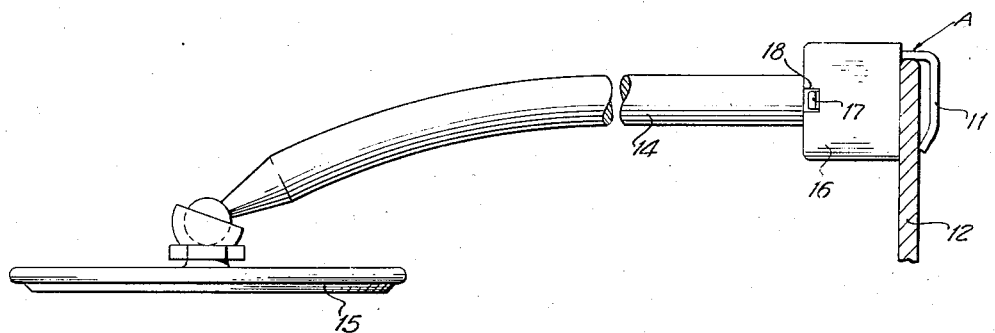
Figure 3:
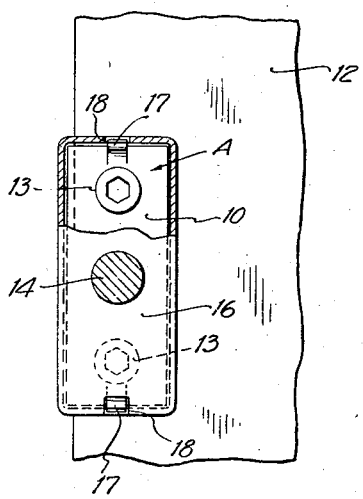
Figure 3 is a vertical transverse sectional view taken on the line 3—3 of Figure 2.

The invention hereinafter disclosed in detail is mainly concerned with a rear view mirror bracket construction which is composed of a minimum number of parts, economical to manufacture, compact and durable in use, and easy to attach and remove. To this end, the invention as set forth in the above figures comprises essentially a U-shaped clamping member A having an outer straight faced leg or side 10 and a curved, resilient, spring-like inner leg or side 11 which member is adapted to be slipped over the edge of the flange of an automobile door or other support 12. Adjusting screws 13 are mounted on the leg 10 and are adjusted to contact with one face of the jamb 12. The resilient nature of the leg 11 will permit the plate to be firmly attached to flanges of varying thicknesses.

Figure 2:
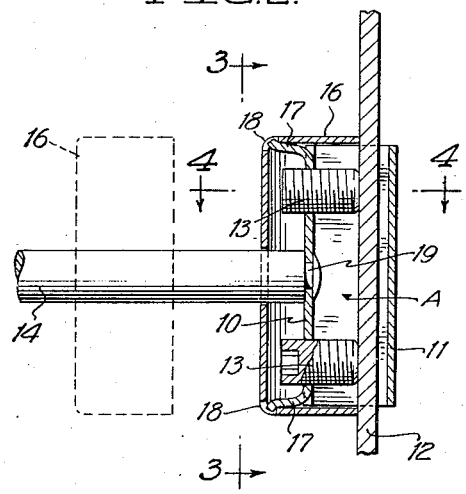
Figure 2 is a fragmentary vertical sectional view through the bracket clamp and showing, in dotted lines, the enclosing casing moved back.
Figure 4:
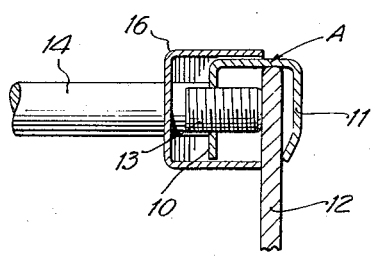
Figure 4 is a horizontal sectional view taken on the line 4—4 of Figure 2.

A rod 14 is fastened at 19 to one end of the leg 10 and at its other end it supports a rear view mirror 15. An enclosing cup-shaped cover member 16 is apertured to slide along the rod 14 and, as shown in Figure 2, is positioned to cover the screws 13 and the leg 10. This cover member is slightly larger in all three dimensions than the clamping member A and it is entirely open on one face; the opposite face having the necessary opening through which the rod 14 passes. The leg 10 has outwardly extending projections, such as resilient latching fingers 17 at each end which are adapted to latchingly engage in apertures 18 in the corners of the rear face of the cover member 16 in order to secure the cover member in its covering position as shown.

In the assembly of the device with respect to a door of an automobile, it is of course understood that the cover member 16 will be loosely disposed somewhere along the rod 14. The U-shaped member A is then fitted over the edge of the door flange 12 which is of variable thickness after which the screws 13 are tightened up to firmly hold the clamping member thereto. The enclosing casing member 16 is then slid along the rod 14 until its forward edges lie close to the adjacent face of the door and the latching fingers 17 will latchingly engage in the apertures 18 of the casing to lock the casing in position. To disassemble the device it is merely necessary to forcibly pull the casing 16 back to disengage the retaining projections or fingers 17 from the apertures 18 whereupon the screws 13 can be engaged by a screw driver to loosen them and permit the U-shaped clamping plate to be readily removed from the door jamb.

It is of course perfectly obvious from a consideration of the description above that the device is composed of a minimum number of simple parts, thus insuring economy in the manufacture of the device, that they can be readily assembled and disassembled, and that they permit of a firm strong unit when assembled on the door of an automobile without injury thereto.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

Having thus described my invention, what I claim as new and desire to secure by Letters Patent is:

1. A bracket for mirrors to be mounted on automobiles, comprising a U-shaped clamping member adapted to be fitted upon the edge of a door, one side of the member being resilient to press against one face of the door along said edge, the other side of said member having a supporting rod affixed to it and extending therefrom, fastening devices carried by said member and flanking said rod to engage the door and bind the clamp upon the edge thereof, and a hollow casing having an opening in one face and slidably mounted on said rod, the opposite face of the casing being opened so that the casing can be pushed along the rod towards said door to enclose and cover all of said clamping member except the resilient portion thereof.

2. The bracket according to claim 1, wherein said clamping member has resilient projections at its opposite ends in position to be received within the casing and hold the latter in covering position.

FRANK ZEILER.

REFERENCES CITED

The following references are of record in the file of this patent:

UNITED STATES PATENTS

| Number | Name | Date |
| --- | --- | --- |
| 2,282,746 | Putterman | May 12, 1942 |
| 851,597 | Le Paugh | Apr. 23, 1907 |